June 9, 1942.　　　　N. P. DARASH　　　　2,285,571
MACHINE TOOL
Filed April 30, 1940　　　9 Sheets-Sheet 1
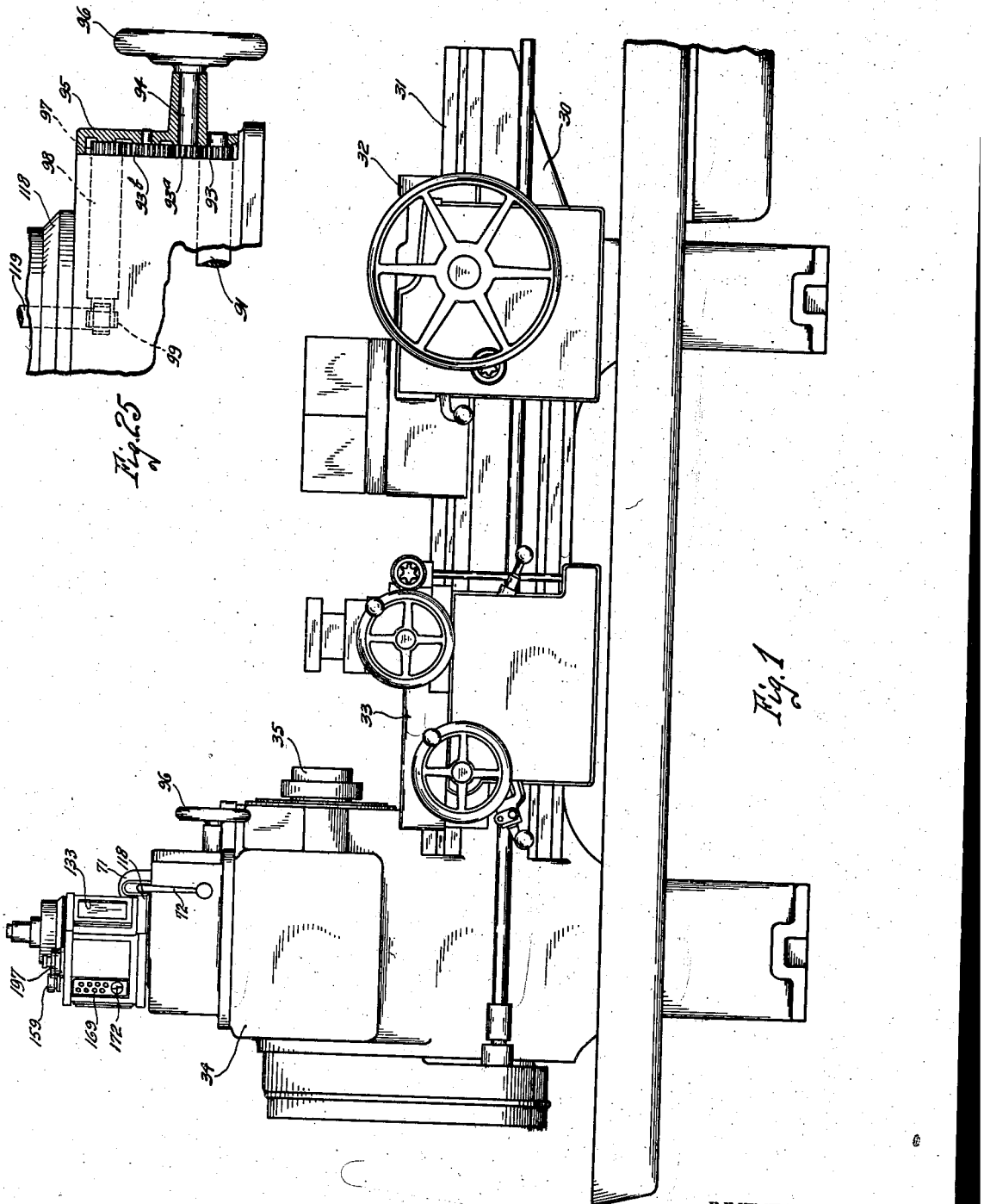
INVENTOR.
NICHOLAS P. DARASH,
BY Kwis Hudson & Kent
ATTORNEYS June 9, 1942.                N. P. DARASH                2,285,571
                              MACHINE TOOL
                         Filed April 30, 1940           9 Sheets-Sheet 2
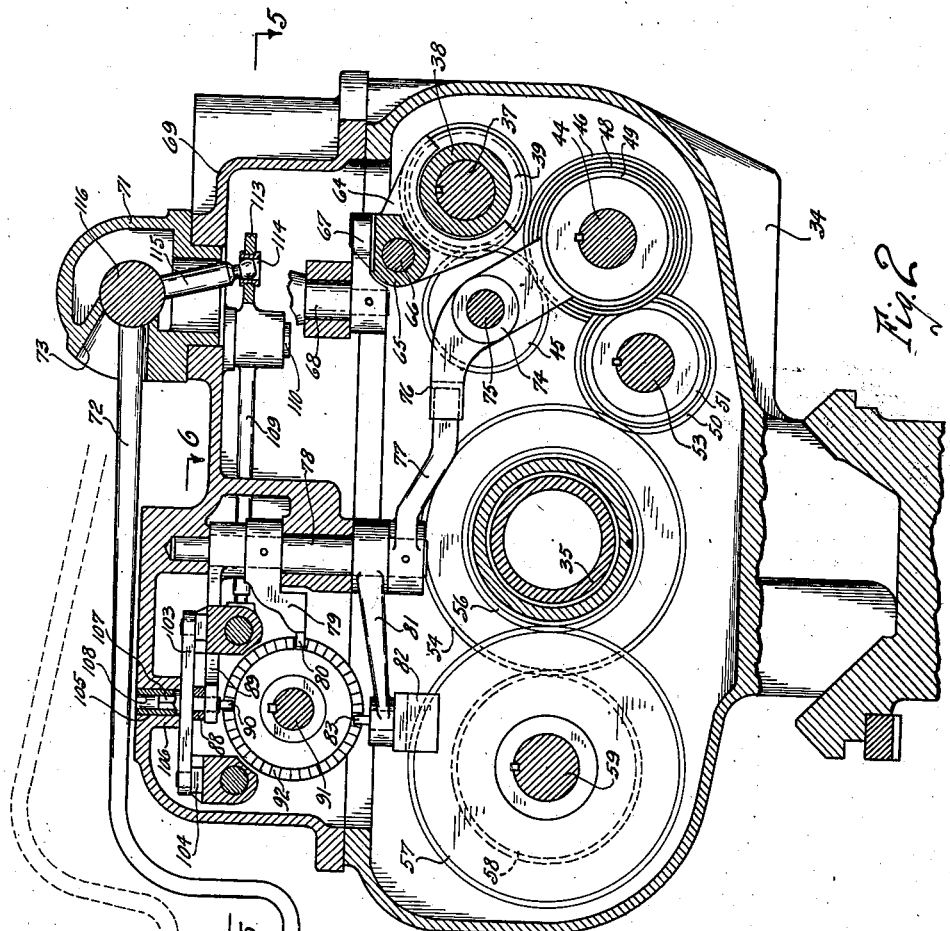
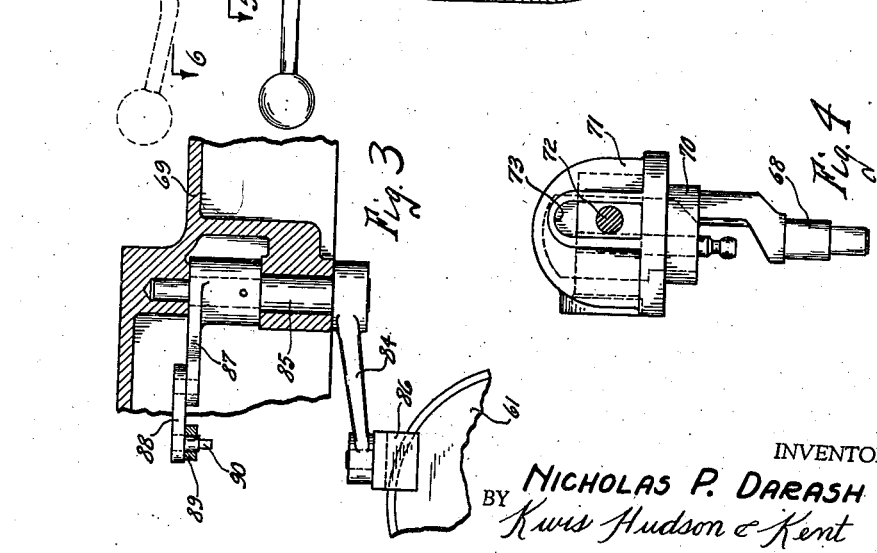
INVENTOR.
BY NICHOLAS P. DARASH
Kwis Hudson & Kent
ATTORNEYS June 9, 1942.   N. P. DARASH   2,285,571
MACHINE TOOL
Filed April 30, 1940   9 Sheets-Sheet 3
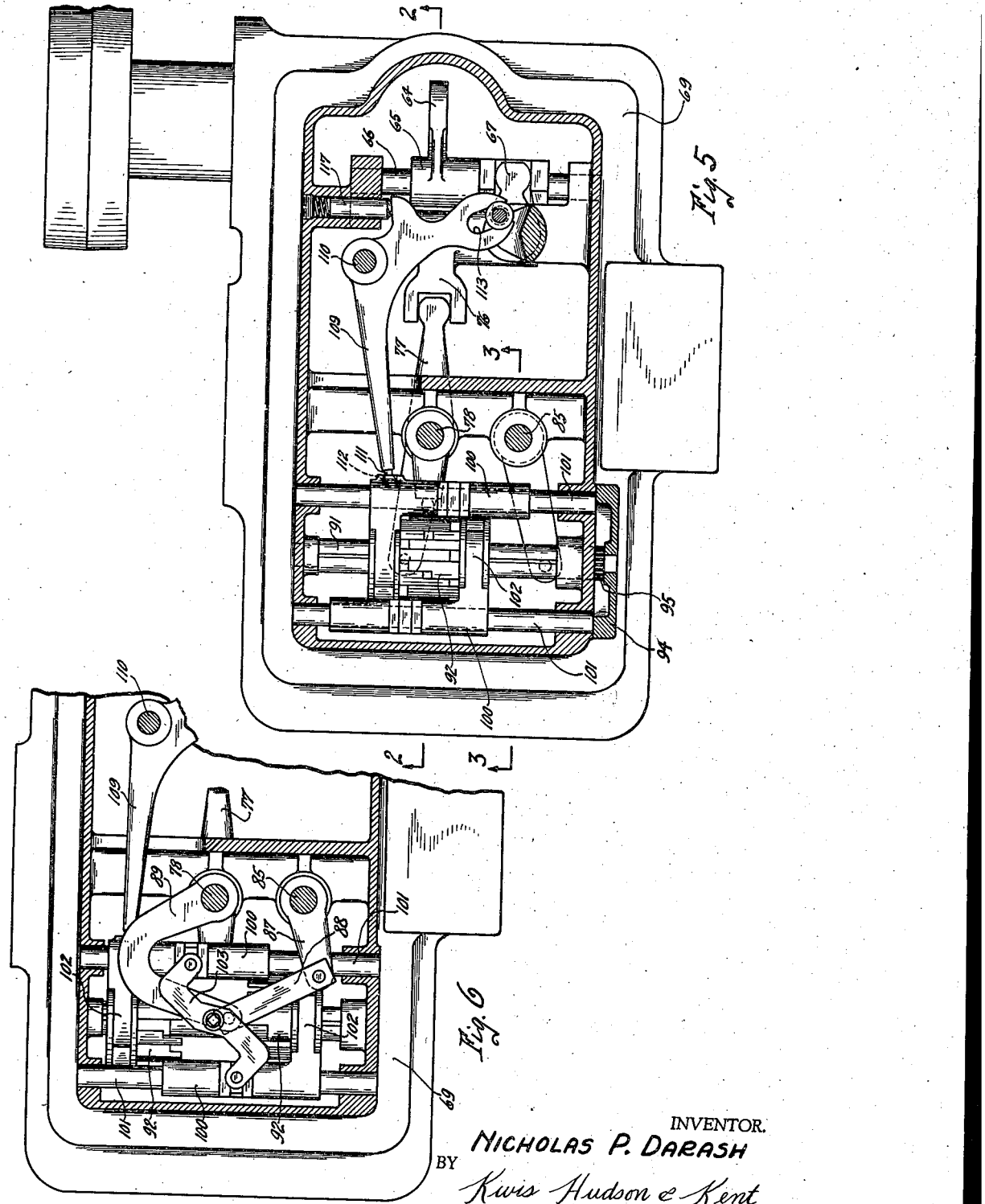
INVENTOR.
NICHOLAS P. DARASH
BY
Kwis Hudson & Kent
ATTORNEYS June 9, 1942.  N. P. DARASH  2,285,571
MACHINE TOOL
Filed April 30, 1940  9 Sheets-Sheet 4
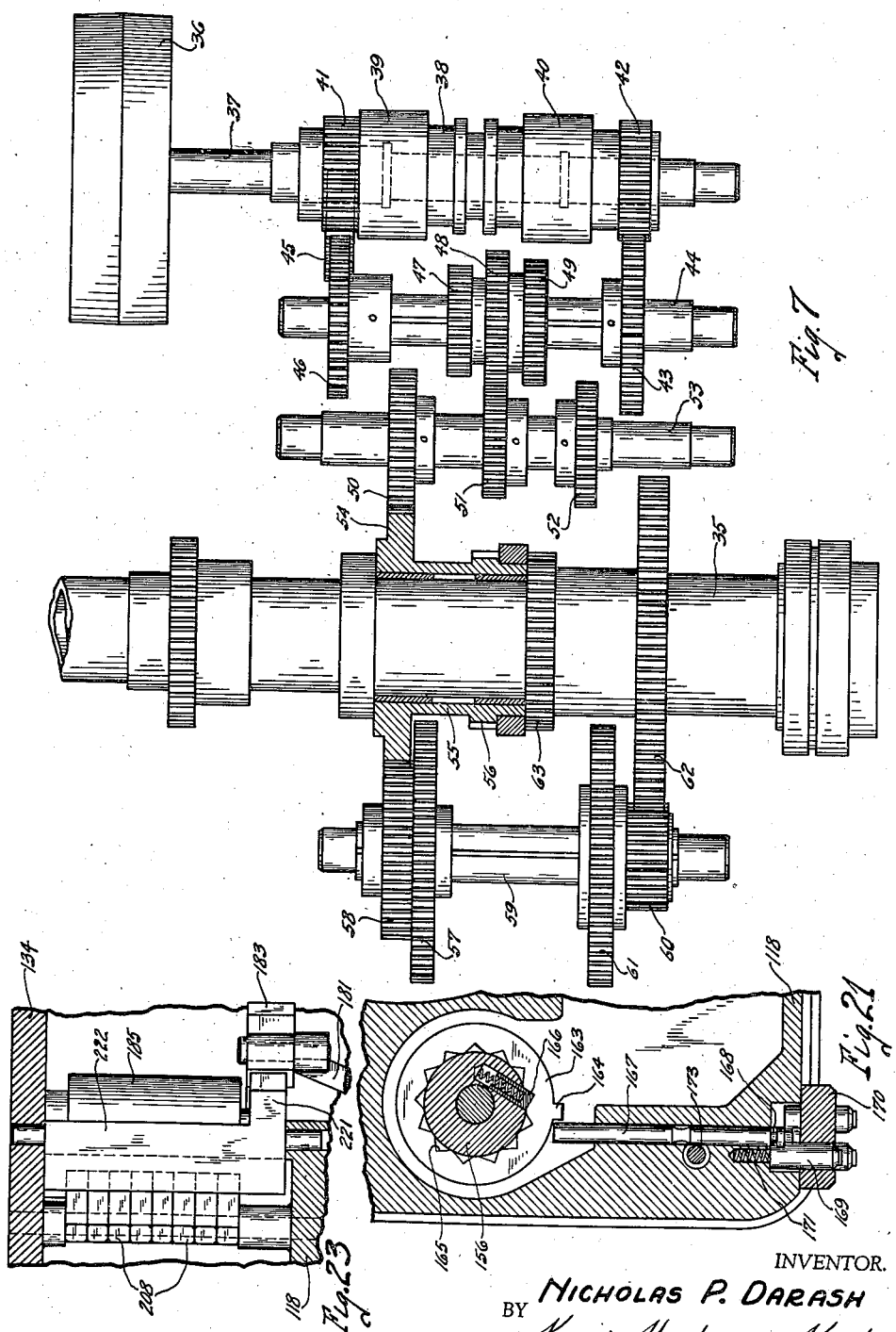
INVENTOR.
NICHOLAS P. DARASH
BY Kwis Hudson & Kent
ATTORNEYS

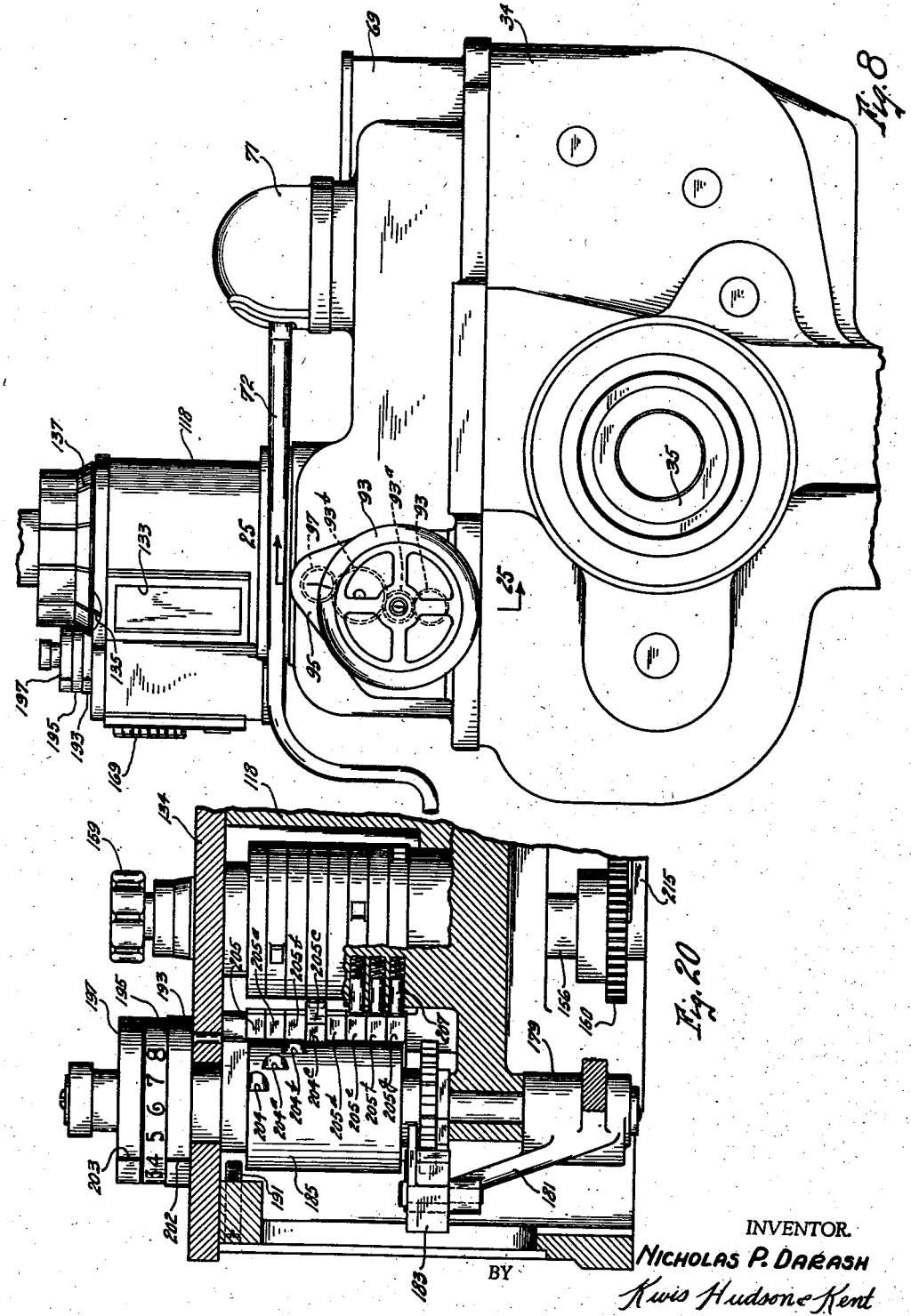

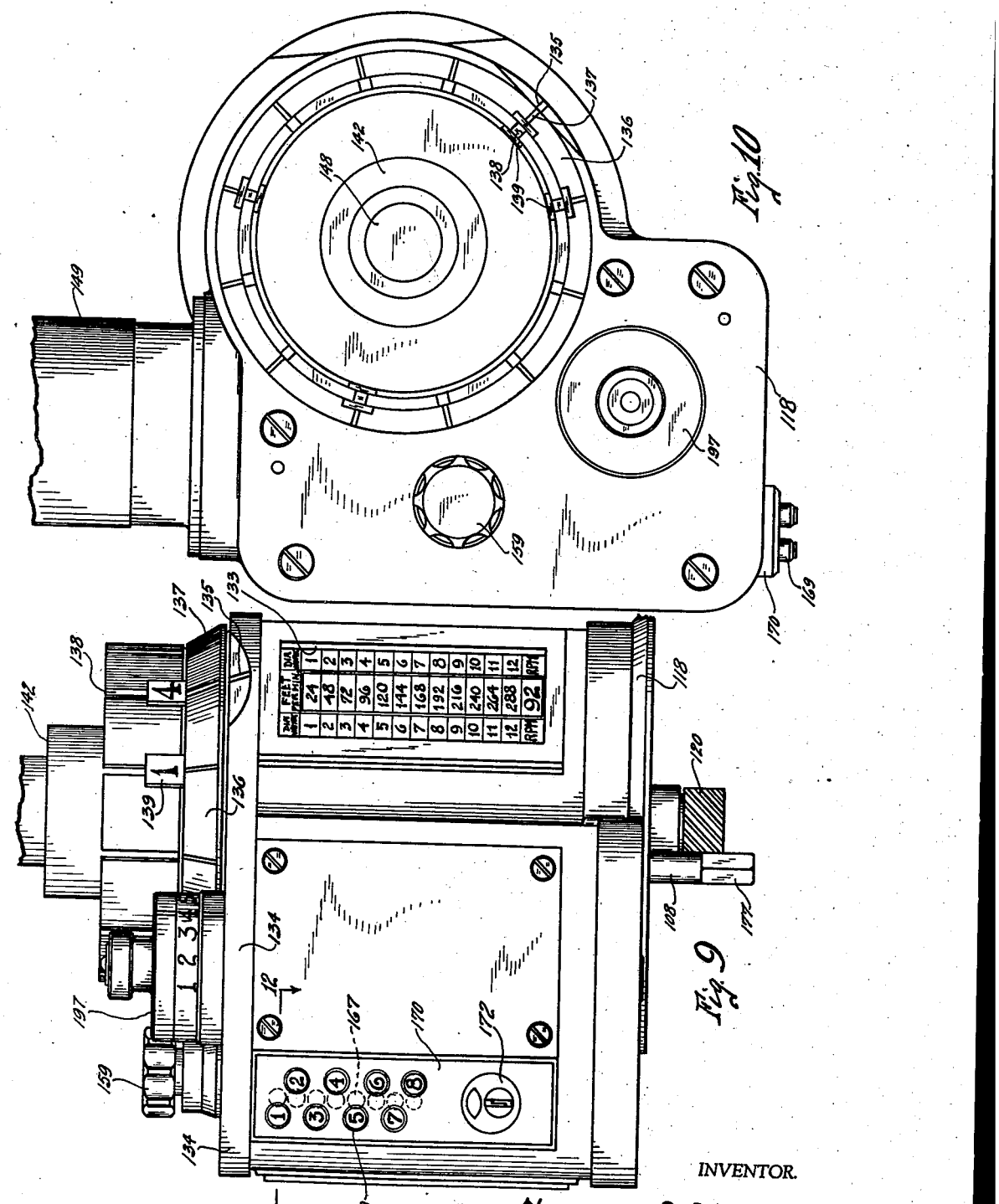

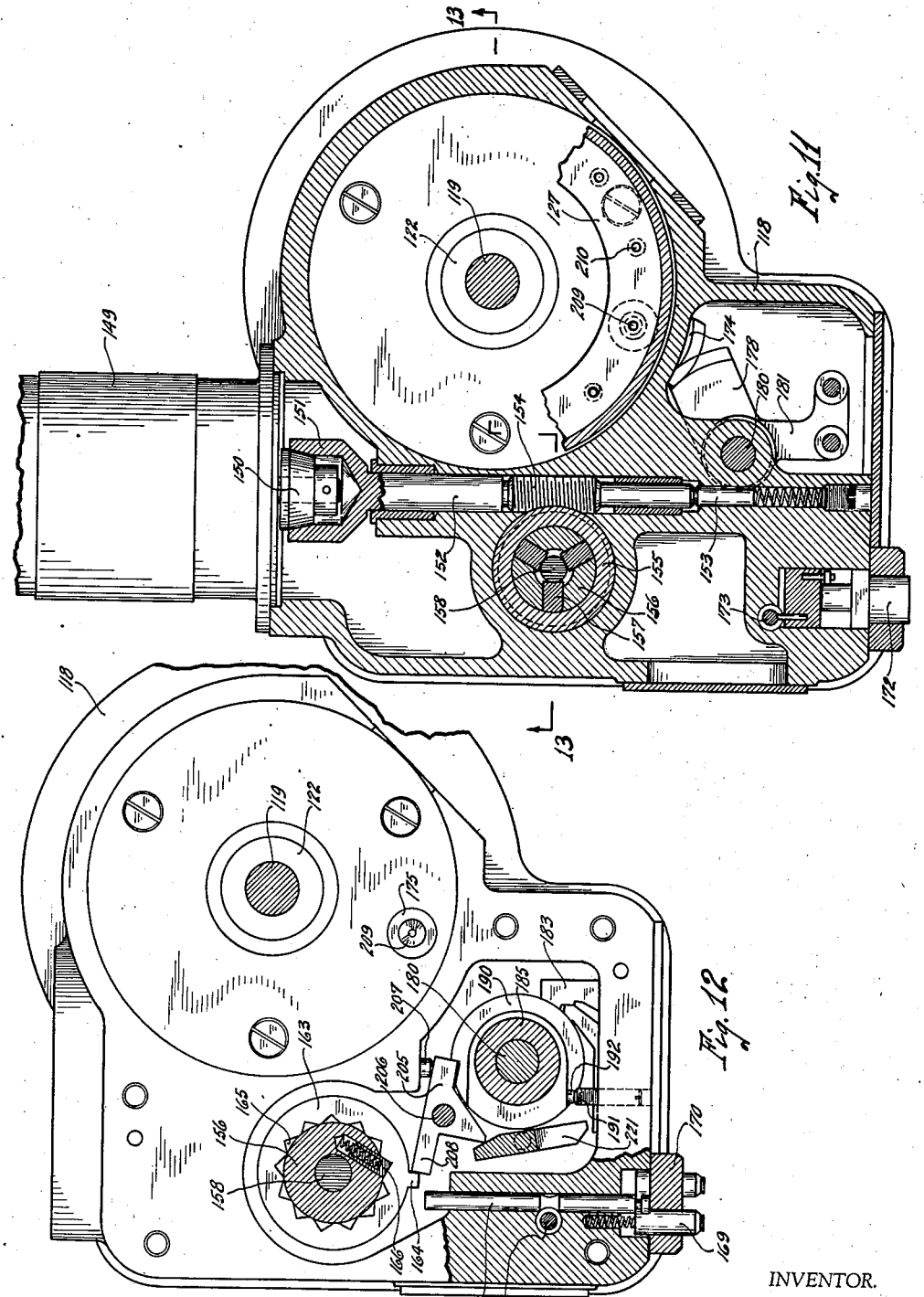

June 9, 1942.   N. P. DARASH   2,285,571
MACHINE TOOL
Filed April 30, 1940   9 Sheets-Sheet 8

INVENTOR.
NICHOLAS P. DARASH
BY
Kwis Hudson & Kent
ATTORNEYS

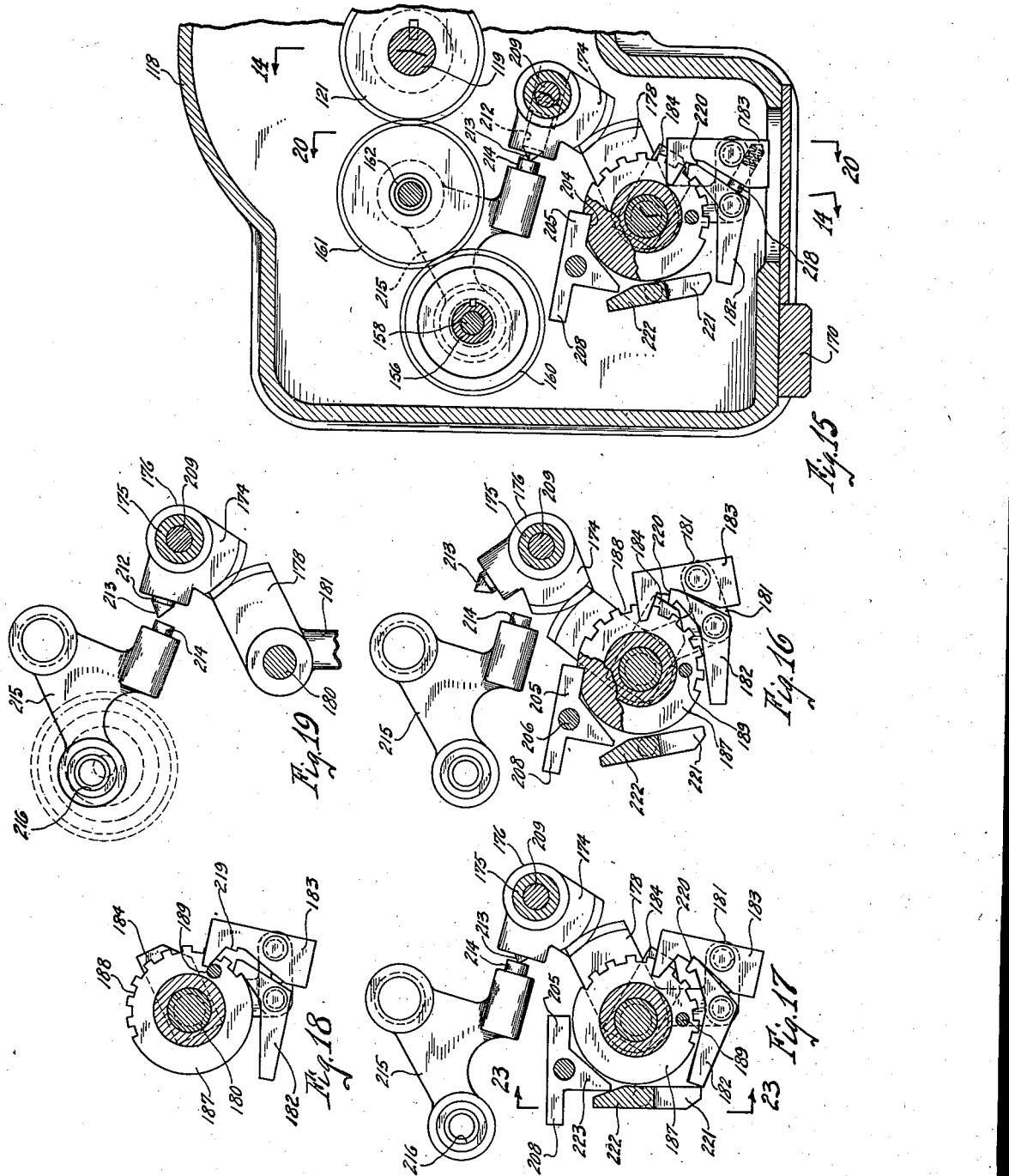

Patented June 9, 1942

2,285,571

UNITED STATES PATENT OFFICE 2,285,571

MACHINE TOOL

Nicholas P. Darash, Cleveland, Ohio, assignor to The Warner & Swasey Company, Cleveland, Ohio, a corporation of Ohio Application April 30, 1940, Serial No. 332,517

29 Claims. (Cl. 29—64)

This invention relates to a machine tool and more particularly to a control device preferably in the form of a unit attachment which is operatively associated with the indexible member or members of a mechanism for selecting or preselecting the different rates of movement of a movable part of the machine tool and which unit functions to index said member or members.

An object of the invention is to provide a control device for the indexible member or members of a selecting or preselecting mechanism for a movable part of a machine tool and which device can be preset to enable the rates of movement which are to be imparted to said part for the different operative steps of a work cycle to be sequentially selected or preselected during said work cycle.

Another object is to provide a control device such as specified in the last named object and which device may be operated manually or automatically as desired to index the indexible member or members of the selecting or preselecting mechanism of a movable part of a machine tool to obtain the different rates of movement for said part for the different operative steps of a work cycle.

A further object is to provide a control device operatively associated with the mechanism for selecting or preselecting the different rates of movement of a movable part of a machine tool for the different operative steps of a work cycle and which device can be adjustably preset in accordance with the different rates of movement to be selected or preselected for the different operative steps in the cycle and then locked against unauthorized alteration of the preset arrangement.

A further and additional object is to provide a control device for the selecting or preselecting mechanism of a movable part of a machine tool and which device includes an indicator for indicating the rates of movement of said part, together with means associated therewith such that said indicator will always show during each operative step the rate of movement of said part for said step and will not indicate the selected or preselected rate of movement for the succeeding step until the start of the operation of the machine in said succeeding step.

A further object is to provide a control device for the mechanism for selecting or preselecting the rates of movement of a movable part of a machine tool and which device is power operated and includes means for automatically connecting and disconnecting the device from its source of power.

Further and additional objects and advantages not hereinbefore specified will become apparent during the detailed description which is to follow of an embodiment of the invention. Referring to the accompanying drawings illustrating said embodiment of the invention, Fig. 1 is a front elevational view of a machine tool to which the invention is applied.

Fig. 2 is a transverse vertical sectional view through the headstock of the machine tool shown in Fig. 1, with the unit attachment embodying the present invention omitted, said view being taken approximately on line 2—2 of Fig. 5 looking in the direction of the arrows.

Fig. 3 is a fragmentary sectional view taken approximately on line 3—3 of Fig. 5 looking in the direction of the arrows.

Fig. 4 is a detached detail view of a part shown in Fig. 2 and is partly in elevation and partly in section.

Fig. 5 is a transverse horizontal sectional view through the headstock taken substantially on line 5—5 of Fig. 2 looking in the direction of the arrows.

Fig. 6 is a fragmentary sectional view taken substantially on line 6—6 of Fig. 2 looking in the direction of the arrows.

Fig. 7 is a developed view of the gearing in the headstock.

Fig. 8 is an end elevational view of the headstock of the machine tool shown in Fig. 1 with the unit attachment embodying the present invention mounted thereon.

Fig. 9 is a detached elevational view of the unit attachment on a larger scale and looking at said unit from the left of Fig. 8.

Fig. 10 is a top plan view of the unit attachment shown in Fig. 9.

Fig. 11 is a sectional view of the unit attachment and is taken substantially on line 11—11 of Fig. 13.

Fig. 12 is a view of the unit attachment partly in top plan with the top plate and the dial of the indicator removed, the portion in section being taken substantially on line 12—12 of Fig. 9.

Fig. 15 is an irregular fragmentary horizontal sectional view through the unit attachment and is taken substantially on line 15—15 of Fig. 14, looking in the direction of the arrows.

Figs. 16, 17, 18 and 19 are detached detail views, partly in plan and partly in section, of certain of the operative parts of the unit attachment and show different relationships assumed by said parts during the operation of the unit.

Fig. 20 (sheet 5) is a fragmentary sectional view taken substantially on line 20—20 of Fig. 15, looking in the direction of the arrows.

Fig. 21 (sheet 4) is a fragmentary sectional view similar to the lower left hand portion of Fig. 12 but showing the parts in different position.

Fig. 23 is a fragmentary detail sectional view taken substantially on line 23—23 of Fig. 17, looking in the direction of the arrows.

Figures 13, 14, 22, 24:
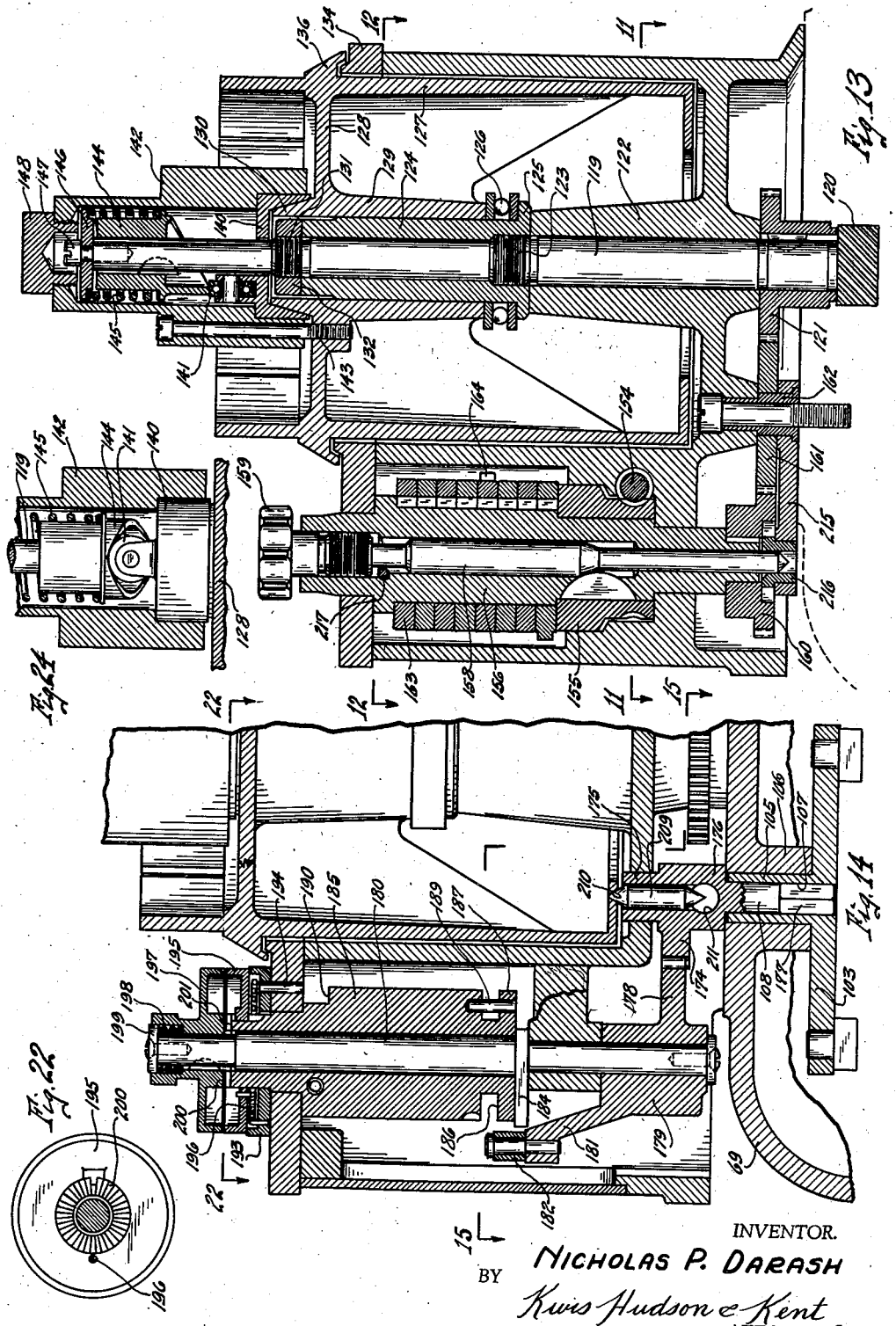
Fig. 13 is an irregular vertical sectional view through the unit attachment and is taken substantially on line 13—13 of Fig. 11.
Fig. 14 is a fragmentary irregular vertical sectional view through the unit attachment and is taken substantially on irregular line 14—14 of Fig. 15 looking in the direction of the arrows.
Fig. 22 (sheet 8) is a detail sectional view taken substantially on line 22—22 of Fig. 14, looking in the direction of the arrows.
Fig. 24 is a detached and fragmentary sectional view corresponding to the upper right hand portion of Fig. 13 but showing the parts in different position, and Fig. 25 (sheet 1) is a fragmentary elevational view, with the housing box on the end of the head cover shown in section, said section being taken on line 25—25 of Fig. 8.

The machine tool shown herein by way of example is a turret lathe and comprises a bed 30 provided with ways 31 on which is slidably mounted a turret slide 32 and a cross slide carriage 33. The headstock 34 of the turret lathe is located at one end of the bed and is provided with the usual work spindle 35, the axis of which is parallel to the ways 31.

The unit attachment embodying the present invention will be described herein as applied to the headstock for controlling the mechanism for selecting or preselecting the different spindle speeds to be used in the different operative steps of a work cycle, but it will be understood that there may be instances wherein it could be applied in other locations on the machine tool for controlling the selecting or preselecting mechanisms for other movable parts thereof.

The work spindle 35 may be driven, in this instance, at any one of twelve different speeds in either the forward or reverse direction by means of change speed gearing located in the headstock and now to be described.

In the present example the source of power for driving the spindle is derived from a belt pulley 36 fixed on a main drive shaft 37 that has splined thereto a shiftable clutch element 38 located intermediate clutch elements 39 and 40 which are freely rotatable on the shaft 37 but held against axial movement. The clutch element 39 has formed thereon a gear 41 while the clutch element 40 has formed thereon a gear 42. The gear 42 is constantly in mesh with a gear 43 fixed to a shaft 44. The gear 41 is constantly in mesh with an idler gear 45 suitably supported in the headstock and which meshes with a gear 46 also fixed to the shaft 44. It will be seen that the shaft 44 can be driven in either the forward or reverse direction from the shaft 37 depending upon the engagement of the shiftable clutch element 38 with the element 40 or 39.

A three-step gear cone formed of the gears 47, 48 and 49 is splined on the shaft 44 and can be moved to any one of three different operative positions to engage the gears 47, 48 and 49, respectively, with gears 50, 51 and 52 fixed to a shaft 53, wherefore it will be seen that the shaft 53 can be driven at any one of three different speeds in either the forward or reverse direction.

The gear 50 is constantly intermeshed with a gear 54 formed on a gear sleeve 55 that is freely rotatable on the spindle 35 but held against axial movement. The sleeve 55 is also provided with a gear 56 and this gear and the gear 54 can be selectively intermeshed, respectively, with the gear 57 or 58 of a rear two-step gear cone splined on a shaft 59. It will thus be seen that the shaft 59 can be driven at any one of six different speeds in either the forward or reverse direction.

A front two-step gear cone is splined on the shaft 59 and is formed of the gears 60 and 61 which can be selectively intermeshed, respectively, with gear 62 or 63 fixed to the spindle 35, wherefore the spindle can be driven at any one of twelve different speeds in either the forward or reverse direction.

The shiftable clutch element 38 is shifted to either one of its engaged positions or to a disengaged or neutral position by means of a yoke 64 that straddles the annular groove in the shiftable clutch element 38 and is formed on a sleeve 65 slidably mounted on a rod 66 supported in the headstock. The sleeve 65 is provided on its upper side with a groove in which is located the rounded end of a lever arm 67 that is fixed to the lower end of a vertically depending shaft 68 rockably mounted in suitable bearing supports formed in the cover 69 of the headstock (see Figs. 2 and 5).

The shaft 68 is integral with a cylindrical bearing portion 70 of a member 71. The said bearing portion 70 of the member 71 is rotatably mounted in an opening in the cover 69 of the headstock and said member has pivotally mounted therein on a horizontal axis a control lever 72 that extends from the member toward the front of the headstock through a relatively narrow elongated slot 73 formed in the member and permitting pivotal movement of the lever 72 about its horizontal axis. It will be understood, however, that when the lever 72 is moved in a horizontal plane the member 71 will be rocked about the bearing portion 70 and through the downwardly extending shaft 68 the lever arm 67 will be rocked and effect a movement of the sleeve 65 and yoke 64 to shift the shiftable clutch element 38.

The three-step gear cone on the shaft 44 is shifted to either one of its three operative positions by means of a sleeve 74 slidably mounted on a rod 75 and provided with a downwardly extending portion, the lower end of which is forked and straddles the gear 48. The sleeve 74 is provided with an upwardly and laterally extending portion having a forked end 76, see Figs. 2 and 5, in which is located the rounded end of a lever arm 77. The lever arm 77 is fixed to the lower end of a vertically depending shaft 78 rockably mounted in suitable bearings formed in the cover 69 of the headstock. The shaft 78 has fixed to it a lever arm 79, the free end of which is provided with a pin 80. It will be seen that when said lever arm 79 is moved the shaft 78 will be rocked to cause the lever arm 77 to swing and move the slide 74 with a resultant endwise movement to the three-step gear cone to bring any one of the three gears thereof into mesh with its mating gear.

The rear two-step gear cone on the shaft 59 is shifted to either one of its two operative positions by means of a lever arm 81 rockably mounted on the shaft 78 and provided on the underside of its free end with a pivoted shoe 82 that straddles the gear 57. The free end of the lever arm 81 on its upper side is provided with a pin 83 which will be referred to later.

The front two-step gear cone is moved to either one of its two operative positions by means of a lever arm 84 fixed to the lower end of a vertically depending shaft 85 rockably mounted in suitable bearings in the cover 69 (see Fig. 3). The lever arm 84 is provided at its free end with a pivoted shoe 86 that straddles the gear 61. A second lever arm 87 has its sleeve portion fixed to the shaft 85 and its free end pivotally connected to one end of a link 88 the opposite end of which is pivotally connected to the free end of a bent lever arm 89 that is freely rockable on the shaft 78 (see Fig. 6). The link 88 and the free end of the bent lever arm 89 at their point of pivotal connection are provided with a depending pin 90 the purpose of which will later be made clear.

It will be seen that if movement is imparted to all or some of the pins 80, 83 and 90 the lever arms and other parts associated therewith will be moved to shift all or some of the shiftable gear cones of the change speed transmission to vary the speed of the work spindle 35.

As illustrative of one form of mechanism for selectively moving the pins 80, 83 and 90 the following is employed. A shaft 91 is rotatably supported in the cover 69 of the head-stock and this shaft has splined thereon a pair of similar spools 92 and which are provided on their adjacent faces with cooperating series of long and short projections, short and long projections and projections of equal length.

The shaft 91 may be rotatably indexed to index the spools 92 to bring certain of the cooperating pairs of projections on the adjacent faces of the spools into operative relationship relative to the pins 80, 83 and 90, which pins it will be understood are located intermediate said adjacent faces of the spools. The shaft 91 is extended through an end wall of the cover 69 of the headstock and has formed on its outer end a gear 93, see Figs. 1, 8 and 25. The gear 93 meshes with a gear 93a fixed to the inner end of a short shaft 94 supported by the housing box 95 and having fixed to its outer end a hand wheel 96, whereby said shaft 91 and spools 92 may be manually indexed.

The gear 93a meshes with an idler gear 93b rotatably supported on a suitable bearing pin carried by the housing box 95, and said idler gear in turn meshes with a gear 97 fixed to one end of a short shaft 98 that extends into the box 95 and is supported in the cover of the headstock, and has fixed to its opposite end a spiral gear 99. The spiral gear 99 meshes with a gear later to be referred to that is operatively connected with the parts of the control and indicating unit attachment embodying the present invention and which unit is mounted on the top of the cover 69 of the headstock and acts to automatically power index the shaft 91 and the spools 92 and to indicate the different spindle speeds as well as the cutting speeds in feet per minute for the different operative steps in the work cycle.

The spools are moved endwise toward and away from each other with an equalized movement by means of similar sleeves 100 slidably mounted on spaced parallel rods 101 supported in the cover 69 of the headstock. The sleeves 100 are provided on their adjacent sides with laterally extending yokes 102 which engage in annular grooves formed in the spools 92.

An equalizer bar 103 is rockably mounted on the underside of the cover 69 and its opposite angularly disposed ends are provided with pivoted shoes 104 located in transverse grooves formed in the upper sides of the sleeves 100. The pivotal connection between the equalizer bar 103 and the cover 69 is in the form of a bearing sleeve 105 integral with the equalizer bar and supported in a bearing boss 106 formed on the underside of the cover 69. The bore in the sleeve 105 has a polygonally shaped portion 107 and a cylindrical portion 108 for a purpose later to be explained.

A bell crank lever 109 is rockably supported on a bearing pin 110 depending from the underside of the cover 69 and one arm of said lever is provided with a spherical portion 111 at its free end which engages in a recess 112 formed in the side of one of the sleeves 100 i. e., the right-hand sleeve, as viewed in Fig. 5. The other arm of the bell crank 109 is provided at its free end with a forked portion 113 which carries a flanged bushing 114 in which is located the rounded lower end of a lever arm 115 depending from the shaft 116 that forms the horizontal axis for the control lever 72 in the member 71, said lever arm 115 extending through the bore in the bearing portion 70 of the member 71, as clearly indicated in Figs. 2 and 4.

It will be seen that when the control lever 72 is rocked about its horizontal axis, i. e., moved in a vertical plane to and from full line to dash line position of Fig. 2, the shaft 116 will be rocked and the lever arm 115 moved to rock the bell crank 109, and such movement will be transmitted to the right-hand sleeve 100 to move the latter linearly and through the equalizer bar 103 impart similar and equalized movement to the other sleeve 100 but in the opposite direction to cause the spools 92 to move toward or from each other with an equalized movement or from the position shown in Fig. 6 to the position shown in Fig. 5 or vice versa.

In order to normally hold the spools 92 in their separated or indexed position, i. e., the position of Fig. 6 and the control lever 72 in its raised or elevated position, i. e., the dash line position of Fig. 2, the cover 69 of the headstock is provided interiorly with a spring-pressed plunger 117 that engages against a heel formed on the bell crank 109, as clearly indicated in Fig. 5.

As previously stated the unit attachment embodying the invention is mounted on the top of the headstock which has a machined surface upon and to which the unit is positioned and secured.

Heretofore it has been customary to mount in a similar position on the headstock an indicating device which is operatively connected with mechanism for selecting or preselecting the different spindle speeds and the unit attachment contemplated by the present invention is of such character that it can be interchangeably used in place of the indicating device just referred to, it being remembered that the said unit attachment embodying the invention includes an indicating device that is operatively connected with the mechanism for selecting or preselecting the spindle speeds and also a control device which can be preset and which functions to index the indexible members of said mechanism to select or preselect the different spindle speeds automatically or manually as desired.

The unit attachment is shown detached in elevation and in top plan in Figs. 9 and 10, respectively, while in Figs. 1 and 8 it is shown in elevation mounted on top of the headstock on the machined surface of the cover 69 thereof.

The unit comprises a housing 118 which is formed of two main portions, namely, a portion for housing the indicating device of the attachment and a portion in which the control device thereof is housed as will later be made clear.

The portion of the housing 118 of the unit in which the indicating device is located is provided with a vertically extending shaft 119 rotatably supported in the housing and having on its lower end a spiral gear 120 which meshes with the spiral gear 99 on the short shaft 98 that is carried in the cover 69 of the headstock and is operatively connected with the hand wheel 93 as above explained.

A gear 121 having an elongated sleeve is keyed to the shaft 119 between the spiral gear 120 and the lower end of an internal hub 122 formed in the housing 118, see Fig. 13. The purpose of the gear 121 will be referred to hereinafter.

The shaft 119 adjacent to the upper end of the internal hub 122 is provided with a threaded portion 123 upon which is screwed the lower end of a sleeve 124 mounted on the shaft and having its lower end bearing upon the upper end of the hub 122 and provided with a flange 125 supporting an anti-friction bearing 126.

An indicating drum 127 is mounted in the housing 118 for rotation therein, and said drum is provided intermediate its ends with a partition 128 at the center of which is an integral sleeve-like portion 129 that surrounds the sleeve 124 and has its lower end supported by the bearing 126 while its upper end above the partition 128 is tapered or cone-shaped, as indicated at 130.

The shaft 119 is provided with a second threaded portion 131 adjacent the upper end of the sleeve 124 and a nut 132 is screwed on said second portion and engages the upper end of the sleeve 124 to clamp said sleeve to the shaft 119 so that it will rotate therewith.

It will be noted that the sleeve 124 forms the bearing upon which the drum 127 can rotate and that the weight of the drum is supported by the ball bearing 126.

It will be understood that the drum 127 on its periphery is provided with suitable indicia representing the twelve different spindle speeds in relation to cutting speeds in feet per minute for different diameter work pieces and said indicia by the rotation of the drum can be brought into position in the window 133 formed in the housing 118.

In order to indicate the spindle speed selected or preselected and to which the drum has been indexed, the cover 134 of the housing 118 is provided with a fixed pointer 135, see Fig. 9, while the drum 127 above the cover is provided with a conical flange 136 on the outer surface of which are a plurality of pointer marks 137 which can be brought into alignment with the fixed pointer 135.

The drum above the flange 136 is extended to provide a cup-like portion above the partition 128 and the wall of said cup-like portion is provided with a plurality of vertically extending slots 138 forming continuations of the marker lines 137 and adapted to removably receive and hold indicating blocks 139 bearing numerals coresponding to the different operative steps of a work cycle and which will be employed in connection with the manual indexing of the drum and the spools 92 in presetting the unit or in manually operating the same when the automatic function thereof is not desired.

Above the tapered or conical portion 130 of the hub 129 of the drum there is arranged loosely on the shaft 119 a clutch element 140 having a tapered or conical clutch face engaging the clutch face of the portion 130. The element 140 on its upper side is provided with an upwardly extending fork in which is supported a roller 141 in the form of an anti-friction bearing. The clutch face of the element 140 is held in clutched engagement with the portion 130 of the drum by an internal shoulder formed in the enlarged portion of a cover sleeve 142 which is connected to the drum 127 by means of a number of screws 143 that extend through the enlarged portion of the cover sleeve and are screwed into suitably threaded openings in the partition 128 of the drum, see Fig. 13.

It will thus be seen that the clutch element 140 during assembly can be adjusted relative to the drum to position the roller 141 in any desired location and then clamped to the drum by means of the cover sleeve 142 and screws 143 to form a substantial part of the drum and move therewith as a unit.

The shaft 119 extends into the cover sleeve 142 and has splined to its upper end a cam member 144. The cam surface of the member 144 is at the inner or lower end thereof and is held in engagement with the roller 141 by a coil spring 145 having its opposite ends abutting a flange on the cam member and a flanged washer 146 secured to the end of the shaft 119 by bolt 147.

It will be appreciated that the spring 145 tends at all times to urge the cam member 144 downwardly and to maintain the camming surface thereof in contact wtih the roller 141. The upper end of the sleeve housing 142 is closed by means of a dust cap 148 that is screwed into the threaded centrally disposed opening at the end of the sleeve.

It will be seen that when the shaft 119 is rotated the cam member 144 will turn therewith and, due to the engagement of its cam edge on the roller 141, will impart turning movement to the drum unless said drum is held by other means against such movement. However, when the drum is held against turning movement by means later to be referred to, the turning of the shaft 119 will cause the cam surface of the member 144 to move relative to the roller 141 from the low point of the cam surface, as shown in Fig. 24, toward the high point thereof as shown in Fig. 13, with the result that the spring 145 is compressed. Consequently when the locking means which has been referred to is retracted and the drum released, the spring 145, acting on the cam member 144 will produce a rotation of the drum relative to the shaft 119 until the roller has again reached the low point of the cam surface as shown in Fig. 24.

It will be understood that if the rotation of the shaft 119 when the drum is locked against rotation has caused the roller to move to one side or the other of the high point of the cam surface, then when the drum is unlocked the rotation thereof relative to the shaft will cause the roller to travel relatively the shortest distance to the low point of the cam at all times, wherefore the rotation of the drum relative to the shaft 119 will be either in a clockwise direction or an anti-clockwise direction, depending upon the shortest distance between the roller and the low point of the cam.

Referring to Fig. 11 the rear of the housing 118 of the unit attachment has secured thereto a flanged motor 149, the shaft of which extends into the portion of the housing in which the control device is located. The motor shaft has secured thereto a friction clutch element 150 of the cone type and which is located within the tapered bore of the enlarged end 151 of a worm shaft 152 that is rotatably supported in the housing so as to have limited endwise movement. The end of the shaft 152 opposite to the enlarged end 151 is in contact with a spring-pressed plunger 153 which acts to force the shaft into clutch engaged position, as will be readily understood. The shaft 152 intermediate its end is provided with a worm 154 which meshes with a worm wheel 155, see Figs. 11 and 13. The worm wheel 155 is rotatably mounted in a bore formed internally of the housing and is operatively connected to a sleeve 156 by means of a positive jaw clutch as indicated at 157. The sleeve 156 is rotatably supported in the housing and is provided with a centrally disposed bore in which is movably mounted a clutch actuating pin 158 having a tapered portion contacting the jaws of the clutch and a threaded portion engaging a threaded portion of the bore in the sleeve 156, wherefore said pin 158 can be screwed by rotating the knob 159 inwardly or outwardly to effect engagement or disengagement of the clutch.

It will be understood that when the positive clutch is disengaged the worm wheel 155 may rotate freely on the sleeve 156 and when said clutch is engaged rotation of the worm wheel 155 will cause rotation of the sleeve 156. The lower end of the sleeve 156, as viewed in Fig. 13, has fixed thereto a gear 160 which, in turn, meshes with a gear 161 which is freely rotatable on a supporting sleeve 162 mounted in the housing. The idler gear 161 in turn is constantly in mesh with the gear 121 previously referred to.

It will be seen that rotation of the sleeve 156 will effect, through the gearing just enumerated, rotation of the shaft 119 and in turn rotation of the drum 127. The sleeve 156 is provided with a plurality of stop disks 163, each of which has a radially projecting lug 164. The inner circumferences of the disks 163 are provided in this instance with thirteen teeth 165, representing the twelve different spindle speeds and a neutral position.

It will also be noted that there are eight disks 163 on the shaft 156, since, in this instance, the maximum number of operative steps in the work cycle will be eight. The sleeve 156 is provided with eight spring-pressed plungers 166, said plungers being arranged in a series extending longitudinally of the sleeve so that each plunger will cooperate with the teeth 165 on a disk 163, as clearly indicated in Figs. 12 and 21.

It will be seen that when a disk 163 is held against rotation and the sleeve 156 rotates in a clockwise direction, the plunger will idle over the teeth 165, but when the sleeve 156 rotates in an anti-clockwise direction the plunger 166 will act as a positive key locking together the sleeve and the disk 163.

In order to adjust the disks 163 to position the lugs 164 in various predetermined circumferential positions related to spindle speeds the following mechanism is employed: The housing 118 carries a vertical series of horizontally extending slidable locating pins 167, as shown in dotted lines in Fig. 9 and in full lines in Figs. 12 and 21. The outer ends of the pins 167 are grooved, as indicated at 168, to receive a lug formed on the inner ends of buttons 169 that are slidably carried in a plate 170 secured to the front of the housing, it being noted that there are eight of these buttons to correspond to the number of pins 167 and that said buttons are staggered, so that each one is operatively connected with a corresponding pin (see Fig. 9). The buttons 169 are urged in an outward direction by springs 171, and the outer end of each button is provided with a numeral or other indicia to indicate an operative step in the work cycle.

It will be seen that when a button 169 is pressed in against the action of the spring 171 its corresponding pin 167 will be moved from the position shown in Fig. 12 into the position shown in Fig. 21, at which time the inner end of the pin 167 will lie in the path of movement of the lug 164 on its corresponding disk 163.

In adjusting the relative positions of the lugs 164 the operator presses the button 169, that corresponds to a certain operative step in the work cycle, inwardly to move the corresponding pin 167 inwardly to the position shown in Fig. 21, and then turns the hand wheel 96 to effect, through the gearing indicated in Figs. 13 and 25, a rotation of the drum 127 and a clockwise rotation of the sleeve 156 until the lug 164 engages the pin 167 and the desired spindle speed on the drum 127 for the particular operative step is brought into line with the pointer 135, whereupon the operator releases the button 169 and allows the same to return to its outer and normal position under the action of the spring 171 to withdraw the pin 167 to the position shown in Fig. 12.

It will be seen that the clockwise rotation of the sleeve 156 when the pin 167 is in the position shown in Fig. 21 will cause a simultaneous clockwise rotation of the particular disk 163 until the lug 164 engages the inner end of the locating pin 167, inasmuch as the pressure of the spring-pressed plunger 166 will be sufficient to cause the disk to move with the sleeve. However, after the lug 164 has engaged the inner end of the locating pin the continued clockwise rotation of the sleeve 156 cannot effect any further rotation of the disk 163 and the plunger or key 166 will merely idle over the teeth 165 with a ratchet action.

It will be understood that when the lug 164 engages the pin 167 the operator will rotate the hand wheel 96 to effect a continued clockwise rotation of the sleeve 156 until the desired spindle speed is indicated on the dial drum by the pointer 135. However, since he cannot actually see the engagement of the lug with the locating pin the operator can detect by the feel of the hand wheel the ratchet action of the plunger 166 over the teeth 165 after the lug has engaged the pin 167 and then by observing the dial can tell when he has correctly moved the sleeve 156 relative to the disk 163 to locate the plunger 166 in predetermined relation to the disk corresponding to the desired spindle speed.

In actual practice, and as a matter of precaution or safety, the operator will normally give a complete revolution to the hand wheel 96 so that he will definitely know the lug 164 is in engagement with the pin 167 and then he will continue the rotation of the hand wheel 196 while observing the indicating dial until the desired spindle speed is brought into line with the pointer 135, after which he releases his pressure on the button 169 as previously referred to. This mode of adjustment is followed for each of the operative steps in the work cycle, that is, if there are four steps in the cycle, the operator will depress successively the buttons corresponding to such steps to adjust the disks 163 likewise corresponding to said steps.

After the disks which correspond to the operative steps in the work cycle have been thus adjusted in relationship to the different spindle speeds to be employed in said steps, the operator may lock all the buttons against inward movement by means of a key-operated lock 172 which is operatively connected to a movable lock pin 173 that is provided with an axial series of circular grooves in line with the pins 167 and which lock pin cooperates with recesses formed in the pins 167.

It will be seen that when the pins 167 are in their normal retracted position as shown in Fig. 12 and the lock 172 has been operated to move the lock pin 173 into position to bring its circumference into the recesses in the pins 167, no inward movement can be given to the pins 167 by the buttons 169. However, when the lock is operated to unlocked position the annular grooves in the lock pin 173 are so located relative to the pins 167 that said pins may then be moved inwardly by the buttons 169, as shown in Fig. 21.

Rockably supported in the unit attachment is a gear segment 174 which has a bearing shaft portion 175 rockably mounted in the bottom wall of the indicator portion of the housing 118 and a second bearing shaft portion 176 which bears against the upper side of the cover 69 of the headstock and has extending downwardly therefrom a reduced cylindrical portion interfitting the cylindrical portion 108 of the bearing sleeve 105 and having at its lower end a polygonal portion 177 which interfits the polygonal portion 107 of said bearing sleeve of the equalizer bar 103.

It will be seen that rocking movement imparted to the equalizer bar 103 by mechanism heretofore explained will in turn impart rocking movement to the gear segment 174 due to the driving relationship between the polygonal shaped portion 107 of the bearing sleeve 105 and the polygonal shaped portion 177 of the bearing shaft 176 of the gear segment 174. The gear segment 174 meshes with a gear segment 178 formed on a pawl support 179 that is mounted on the reduced lower end of a cam shaft 180, see Fig. 14. The pawl support 179 has an upwardly extending arm 181 which carries at its upper end pivotally mounted pawls 182 and 183, the first of which will be referred to as an actuating pawl and the second as a retaining pawl. The functions of these pawls will become more apparent hereinafter.

The reduced lower end of the cam shaft 180 is rockably supported in a bearing boss formed integral interiorly of the housing 118 and said shaft has integrally formed thereon above said bearing boss a plate type cam 184, the purpose of which will also become apparent hereinafter, see Figs. 14 and 18. Above the cam 184 a stop drum 185 is freely rotatable on the cam shaft 180 and said drum has a reduced bearing portion which extends through an opening in the cover 134.

The stop drum 185 adjacent its lower end is provided with an annular groove 186 forming at the lower end of the drum a flange 187, a portion of the circumference of which flange is provided with circumferentially spaced teeth 188, there being eight of these teeth to correspond to the eight operative steps in the work cycle, as has been assumed for purposes of illustration.

Secured in the stop drum 185 so as to extend transversely of the annular groove 186 is a pin 189, the purpose of which will later be pointed out. The stop drum 185 just below the cover 134 is provided with a segmental shoulder 190 to form clearance for an adjustable abutting or stop screw 191 which is mounted in the housing 118 and can be adjusted from exteriorly thereof, see Figs. 12 and 20. The stop drum carries a fixed stop pin 192 which registers with and abuts against the stop screw 191 when the drum is rotated in an anti-clockwise direction as viewed in Fig. 12. The rotation of the drum in the anti-clockwise direction is effected by mechanism now to be explained.

A washer 193 is mounted on the bearing portion of the drum above the cover 134 and is held in fixed non-rotative position by means of a pin 194 carried by the cover and extending into the washer. Above the washer 193 is a cup-shaped washer 195 that is keyed to the bearing portion of the drum, see Fig. 14.

A rat trap spring 196 is located intermediate the washer 193 and the underside of the washer 195 and has one of its ends fixed to the washer 193, while its opposite end is attached to the washer 195. The rat trap spring 196 is so arranged that rotation of the cam shaft 180 and drum 185 in a clockwise direction will tension the spring, and unless the drum is held against reverse rotation said tensioned spring will cause said drum to rotate in an anti-clockwise direction until the stop pin 192 engages the stop screw 191, at which time, of course, further movement of the drum in the anti-clockwise direction is stopped.

In order that the position of the cam 184 relative to the drum 185 may be varied the following arrangement is utilized: Outwardly of the cup-shaped washer 195 an operation indicating knob 197 is splined to the reduced upper end of the cam shaft 180 and is normally urged toward the washer 195 by means of a spring 198 surrounding the end of the cam shaft 180 within a recess formed in the outer end of the knob and abutting against said knob and a retainer plate or washer 199 secured to the end of the shaft 180. The outer end of the stop drum 185 is provided with serrations or teeth 200 which, due to the spring 198, are normally interengaged with similar serrations or teeth 201 formed on the inner end of the hub portion of the knob 197 (see Fig. 22). The teeth or serrations 200 and 201 are spaced in degree circumferentially a distance equal to the circumferential spacing of the teeth 188 that are in the flange 187 of the drum 185.

It will be seen that when the knob 197 is pulled outwardly against the action of the spring 198 so as to disengage the teeth 200 and 201 the cam shaft 180 can be rotated by the knob independently of the drum 185 to change the relationship between the cam 184 and said drum and when the cam has been positioned in a predetermined location and the outward pull on the knob released the spring 198 will effect a reengagement of the teeth 200 and 201 and the cam will be positioned in the adjusted predetermined location relative to the drum.

As will later become more apparent, the location of the cam 184 with respect to the drum 185 is determined by the number of steps in the operative cycle, since said cam functions to release the drum and allow it to be restored by the rat trap spring 196 to its initial position, i. e., the position required for the first operative step.

In order that the relative location of the cam 184 with respect to the drum 185 may be visually determined and indicated, the cup-shaped washer 195 is provided on its periphery with a series of numerals indicating the operative steps, while the fixed washer 193 has on its periphery a fixed pointer line 202 to cooperate with said numerals and with a pointer line 203 located on the periphery of the knob 197.

It will be understood that the knob 197 can be pulled out and turned to bring the pointer line 203 in line with any one of the numerals corresponding to the number of operative steps in the work cycle and then released, at which time the cam will be properly positioned to function to release the drum for restoration to its initial position upon the completion of the said number of operative steps.

Referring to Fig. 20, the pointer line 203 on the knob 107 is positioned over the numeral 4, since it has been assumed that there are four operative steps in the work cycle, and it will be noted that the fixed pointer line 202 is beneath the numeral 4, indicating that the fourth step of the cycle has been reached.

It will be understood that when the drum returns to its initial position upon the completion of the fourth step in the cycle the fixed pointer line 202 will lie beneath the numeral 1 and as the second and third operative steps are initiated said fixed pointer line will lie respectively below the numerals 2 and 3, to indicate the current operative step at which the machine is functioning.

The drum 185 is provided on its external surface in this instance with eight spaced notches, four of which are shown in Fig. 20 and indicated at 204, 204a, 204b and 204c. These notches are spaced in degree circumferentially of the drum a distance corresponding to the spacing of the teeth 188 formed in the flange 187 of the drum 185. It will be understood that the remaining four notches do not appear in Fig. 20 as they lie behind the drum 185. The notches are also spaced axially of the drum 185 so that each notch is in horizontal alignment with a pivoted stop finger, indicated in Fig. 20 at 205, 205a, 205b, 205c, 205d, 205e, 205f and 205g, rockably mounted on a shaft 206 supported in the lower portion of the housing and the cover plate 134, it being understood that there are eight of the stop fingers to correspond to the eight notches in the drum 185 and representing the eight different operative steps in the work cycle.

The stop fingers are normally urged toward the drum 185 by spring-pressed plungers 207 arranged in a vertical series within the housing, so that when any one of the stop fingers registers with its cooperating notch during the clockwise movement of the drum 185 it will move into the same to hold the drum against anti-clockwise movement as will later be pointed out more fully, (see Figs. 12 and 20).

Each stop finger is provided also with a stop portion 208 which when the stop finger is in engagement with its notch in the drum 185 lies in the path of movement of the lug 164 on the disk 163 which is correlated to the same operative step in the work cycle as the particular stop finger.

Assuming that the uppermost disk 163, as viewed in Fig. 13, is so located that its lug 164 is not in engagement with the stop portion 208 of the stop finger 205, then upon the motor 149 being operated said disk 163 will rotate in an anti-clockwise direction until the said lug 164 engages the stop portion 208, whereupon further rotation of the uppermost disk 163 will be stopped as well as further rotation of the sleeve 156 which carries the disk and the worm wheel 155 that is clutched thereto, with the result that the worm shaft 152 will move endwise against the action of the spring-pressed plunger 153 and effect a disengagement of the friction clutch elements 150 and 151, the motor continuing to operate however.

Assuming that an indexing movement in a clockwise direction is given to the drum 185 by mechanism later to be explained, it will be seen that the stop finger 205 will ride out of its notch 204 and said stop finger will travel on the periphery of the drum 185, thus being rocked against the action of its spring-pressed plunger 207 and withdrawing the stop portion 208 from engagement with the lug 164 of its companion disk 163, as viewed in Fig. 12.

The indexing movement just referred to imparts a partial rotation to the drum 185 until the stop finger 205a engages in the notch 204a to prevent reverse rotation of the drum 185 in an anti-clockwise direction upon the termination of the indexing movement, at which time the stop portion 208 of the stop finger 205a will lie in the path of travel of the lug 164 of the second disk 163 which is related to the stop finger 205a.

As soon as the stop portion 208 of the stop finger 205 has been moved out of engagement with its companion lug 164 the companion disk 163 is free to rotate, whereupon the spring-pressed plunger 153 moves the worm shaft 152 axially to engage the clutch elements 150 and 151 to operatively connect the motor 149 to the sleeve 156 and the disks carried thereby, whereupon said sleeve and all the disks rotate. This rotation of the sleeve 156 and the disks 163 continues until the lug 164 on the disk 163 that is companion to the stop finger 205a engages with the stop portion 208 of said finger which, of course, operates to stop further rotation of the disks and sleeve and automatically causes the worm shaft 152 to move axially against the action of the spring-pressed plunger 153 to disengage the friction clutch connection to the motor 149. This mode of procedure is followed for the different operative steps in the work cycle as, for example, assuming that there will be four operative steps in the cycle, until stop fingers 205b and 205c have also engaged with notches 204b and 204c in a similar manner to effect a stoppage of their companion lugs 164 of the third and fourth disks 163 and the sleeve 156.

It will be recalled that the disks 163 and the lugs 164 carried thereby have been arranged in predetermined relative positions with respect to the sleeve 156 related to the different spindle speeds in the different oprative steps and that said sleeve 156 is operatively connected through gearing with the shaft 119 which, in turn, is operatively connected with the indicating drum 121 and said drum will be indexed with the sleeve 156 in equal degree so that the indicator will show the particular speeds provided it is not held or locked against rotative movement.

In order to lock the indicating drum 127 against rotative movement a lock bolt 209 is provided and this bolt is located in a vertical bore in the bearing shaft portion 175 of the gear segment 174. The lock bolt 209 has its opposite ends tapered and its upper end is adapted to engage in a series of circumferentially spaced openings 210 formed in the bottom of the indicating drum 127, see Figs. 11 and 14, there being as many openings 210 as there are indicating positions on the indicating drum. In this instance twelve openings are provided since there are twelve different spindle speeds. The lower end of the lock bolt 209 extends into a horizontal bore 211 arranged at right angles to the vertical bore and in said horizontal bore there is slidably mounted a shouldered actuating pin 212 having at its inner end a tapered portion cooperating with the tapered lower end of the lock bolt to cam said bolt upwardly into an opening 210 when inward endwise movement is imparted to the actuating pin 212.

The outer end of the actuating pin 212 is provided with a tapered camming portion 213 adapted to cooperate with a normally fixed cam 214 carried by a support 215 that is rockably mounted on the sleeve 162 and is provided in one of its arms with an opening in which is mounted a bushing 216 having a tapered portion at the upper end of the bore therethrough.

The tapered lower end of the clutch actuating pin 158 is adapted, when said pin is in clutch engaged position, to extend into said bushing, with the result that the support 215 is held against rocking movement on the sleeve 162. If the clutch actuating pin 158 is screwed outwardly to clutch disengaged position, the tapered lower end of said pin will lie in the tapered upper end of the bore through the bushing 216, at which time the support 215 can rock from the position shown in Fig. 15 to that shown in Fig. 19 and when in the latter position the cam 214 is out of operative relationship with the tapered end 213 of the actuating pin 212. At this time, due to the tension of the spring 145 and the tendency of the indicating drum 127 to rotate, the lock bolt 209 is forced to unlocked position and the drum is free to rotate. The condition just referred to is obtained when it is desired to manually index the spools 92 without utilizing the mechanism for automatically indexing the same.

The movement of the clutch actuating pin 158 to clutch engaged or clutch disengaged position is limited by means of a limit or stop pin 217 carried by the sleeve 156 and located intermediate axially spaced shoulders on the pin 158.

It will be seen that when the support 215 is locked against rocking movement by the pin 158 and is in the position indicated in Fig. 15, as is also the gear segment 174, then the tapered end 213 of the actuating pin 212 is in engagement with the fixed cam 214 and said actuating pin has been forced inwardly in the horizontal bore so that its inner end cooperates with the lower end of the lock bolt 209 and cams said bolt upwardly until the tapered upper end thereof is in one of the openings 210 and the indicating drum is held against rotative movement.

When the spools 92 are in their outer or separated positions and the equalizer bar 103 is rocked to move said spools inwardly or toward each other, the gear segment 174 being operatively connected with the equalizer bar 103 is rocked from the position shown in Fig. 15 to the position shown in Fig. 16, at which time the tapered end 213 of the actuating pin 212 has moved off of the fixed cam 214 and the lock bolt 209 has moved to retracted position to allow the indicating drum to rotate under the action of the spring 145 until the spindle speed which has been preselected by the indexing of the spools 92 is in line with the fixed pointer of the indicating device, that is, the indicating device will now indicate the spindle speed which has been preselected. When the spools 92 are again moved from their inner or actuating position to their separated or indexing position the rocking of the equalizer bar 103 to effect such movement will rock the gear segment 174 from the position shown in Fig. 16 back to the position shown in Fig. 15, at which time the actuating pin 212 contacts the fixed cam 214 and the lock bolt is again cammed into locked position with its tapered upper end in one of the openings 210.

From the foregoing it will be observed that when the spools are in indexing position, i. e., their separated positions, the indicating drum is held against rotative movement, and consequently indexing of said spools while in such position does not rotate the drum but merely rotates the shaft 119 and tensions the spring 145 by the camming action of the roller 141 on the lower cam edge of the cam member 144. As soon as the spools 92 move toward each other to actuating position to obtain the spindle speed which has been preselected, then the lock bolt 209 is withdrawn and the indicating device will rotate to indicate the spindle speed previously preselected. It will be remembered, as previously explained, that the rotation of the indicating drum to the indicating position just referred to is stopped by the engagement of the roller 141 in the V-notch of the cam 144, as indicated in Fig. 24.

As previously stated, the segment 174 is in mesh with the segment 178 formed on the pawl support 179 and which support is provided with an upstanding arm 181 at the upper end of which are the actuating pawl 182 and the retaining pawl 183.

When the stop drum 185 is in the position shown in Fig. 12, with the stop 192 in engagement with the stop screw 191 and the spools 92 are in their outer or indexing position, the actuating pawl 182 and the retaining pawl 183 will be in the position shown in Fig. 18. It will also be understood that the device having been set for four operative steps in a work cycle, as indicated on the operations indicating knob shown in Fig. 9, the cam 184 will be positioned as indicated in Fig. 18, that is, with the cam edge of said cam located four teeth 188 from the tooth first engaged by the hook portion of the actuating pawl 182. At this time the pin 189 is in engagement with the retaining pawl 183, as indicated in Fig. 18, and has unhooked said pawl from the actuating pawl 182.

Assuming that the operator moves the main control lever to effect an inward movement of the spools 92, the rocking of the equalizer bar 103 to attain this end will rock the gear segment 174 and, in turn, the segment 178 and pawl support 179. This rocking movement of the pawl support causes the actuating pawl 182 to ride out of engagement with the first tooth 188 and into engagement with the second tooth 188, the spring pressed plunger 218 carried by the retaining pawl 183 forcing the hooked portion of the actuating pawl into engagement with the second tooth, while the shoulder 219 of the retaining pawl bears upon the outer side of the actuating pawl and the hook of the retaining pawl has moved one tooth space away from the pin 189.

The spools 92 are now in their inward or actuating position and when the main control lever is moved to move said spools to their outer or indexing position the pawl support 179 is again rocked but in the opposite direction from that previously described, with the result that the actuating pawl 182 indexes the stop drum 185 one tooth space in a clockwise direction, as viewed in Fig. 16. This indexing movement of the stop drum causes the stop finger 205 to ride out of the notch 204 onto the periphery of the drum 185 and just as the indexing movement is completed the stop finger 205a will drop into the notch 204a to prevent anticlockwise movement of the stop drum 185.

As soon as the stop finger 205 has ridden out of the notch 204 the stop portion 208 is disengaged from the lug 164, with the result that the first stop disk 163 travels with the sleeve 156, whereupon the spring plunger 153 can act on the worm shaft 152 to engage said shaft with the motor 149 to effect a power rotation of the sleeve and disks 163 until the stop lug 164 of the second disk 163 engages with the stop portion 208 of the stop finger 205a, whereupon the friction drive from the motor 149 is interrupted. As previously described, the sleeve 156 is operatively connected with the spools, wherefore it will be understood that the power rotation of the sleeve just described effects a predetermined indexing movement of the spools 92 to preselect the spindle speed for the second operative step in the work cycle.

It will also be recalled that the shaft 119 will have been rotated a predetermined distance to tension the spring 145 so that the indicating drum 127 will be rotated to the preselected spindle speed as soon as the lock bolt 209 is withdrawn.

At the completion of the first operative step the operator moves the main control lever to disengage the main driving clutch and then moves said lever to effect an inward movement of the spools 92 to obtain the speed preselected. This inward movement of the spools effects a withdrawal of the lock bolt 209, as previously explained, to cause the indicating device to indicate the speed preselected, and it also causes the actuating pawl 182 to ride out of engagement with the second tooth 188 and into engagement with the third tooth 188 in the manner previously explained.

After the preselected spindle speed for the second operative step has been obtained, the operator then moves the control lever to engage the main driving clutch and initiate the second operative step of the cycle, and then moves said lever to effect an outward movement of the spools 92 to again index the stop drum 185 to its third position in the manner described for the indexing of said stop drum for the second position and the operation is continued in the same way until the end of the fourth operative step of the work cycle.

As the machine is being operated successively through the four operative steps, as has been explained, the cam 184 has been moved step by step from the position shown in Fig. 18 to the position shown in Fig. 15, wherein the actuating pawl is in engagement with the fourth tooth 188. Upon the completion of the fourth operative step in the cycle the operator moves the main control lever to disengage the main driving clutch and to effect an inward movement of the spools 92 to cause the pawl support 179 to move in an anti-clockwise direction, with the result that the actuating pawl 182 rides out of engagement with the fourth tooth 188 and upon the cam 184, and rocks the retaining pawl 183 until the hooked end of the actuating pawl interlocks with the locking portion 220 of the retaining pawl 183, as indicated in Fig. 16.

When the hooked ends of the actuating pawl and the retaining pawl are in the relative positions shown in Fig. 16, the other end of the actuating pawl 182 has moved radially inwardly, wherefore when the operator through the main control lever causes the spools 92 to move outwardly to indexing position the resultant clockwise movement of the pawl support 179 with the actuating pawl 182 and retaining pawl 183 in the relationship shown in Fig. 16 causes said other end of the actuating pawl 182 to engage with the lower arm portion 221 of a rockably supported knockout plate 222 which is in contact with a third portion 223 of all the stop fingers, see Figs. 17 and 23, to move the fourth stop finger 205c out of contact with the fourth notch 204c.

It will be understood that the purpose of having the knockout plate 222 contact with the third extending portion 223 of all the stop fingers is that no matter which stop finger is holding the drum, depending upon the number of operative steps in the work cycle, said knockout plate will function to move the same out of engagement with the particular notch in the drum.

As soon as the fourth stop finger 205c has thus been rocked to release the drum 185 and allow it to have anti-clockwise movement, the rat trap spring 196 functions to impart such movement to the drum and rotate the same until the stop pin 192 contacts with the stop screw 191 and further anti-clockwise movement of the drum is arrested. During the indexing movement of the drum, as previously explained, the pin 189 has moved step by step in a clockwise direction from the position shown in Fig. 18 to the position shown in Fig. 17. During the last portion of the anti-clockwise movement of the stop drum 185, the pin 189 moves to its former position and again comes into contact with the surface of the retaining pawl 183, as indicated in Fig. 18, and rocks said pawl to release the locking portion 220 from the actuating pawl 182, whereupon the hook portion of the actuating pawl under the pressure of spring plunger 218 again engages with the first tooth 188.

The movement of the hooked end of the actuating pawl 182 into engagement with the first tooth 188 disengages the other end of said actuating pawl from the arm 221 of the knockout plate 222, with the result that said plate will be rocked by the action of the stop finger 205 under the pressure of the spring plunger 207 from the position shown in Fig. 17 to the position shown in Fig. 16, at which time the stop finger 205 will engage in the notch 204 and the parts are now restored to starting position from whence the machine can again function through the four operative steps of the complete work cycle.

It will also be understood that the cam 184 moves during the anti-clockwise rotation of the drum 185 from the position of Fig. 17 back to its position in Fig. 18.

It will be understood that when the operator moves the main control lever to effect an inward movement of the spools 92 the spindle speed preselected for the first operative step will be obtained, and, as soon as the control lever is moved to engage the main driving clutch, the machine will be operating in the first operative step.

From the foregoing description it will have been noted that a machine equipped with the unit attachment embodying the invention can be obtained to select or preselect the spindle speeds manually, or as will probably be the preferred way, the machine can be operated with the unit attachment automatically selecting or preselecting the spindle speeds.

When it is desired to operate the machine with manual selection or preselection of the spindle speeds, the operator screws the clutch actuating pin 158 outwardly to disengage the tapered lower end thereof from the bushing 216, which act also disconnects the worm wheel 155 from the sleeve 156. Likewise the lock bolt 209 will now be inactive. It will be understood, of course, that during manual selection or preselection of the spindle speeds the motor 149 is not operating.

When the conditions just set forth have been attained the operator selects or preselects the various spindle speeds by manually rotating the hand wheel 93 when the spools 92 are in their outer or indexing position, and such rotation of the hand wheel 93 effects a rotative movement of the indicating drum 127 to indicate the speed selected or preselected, it being understood that the drum 127 will now rotate with the shaft 119 due to the roller 141 being located in the V of the cam 144 and the restraining effect of the lock bolt being absent.

During the manual indexing of the spools 92 to select or preselect the spindle speeds, the sleeve 156 and/or the disks 163 will be rotated in a clockwise direction and any engagement between the lugs 164 and the stop portions of the stop fingers will merely rock said fingers on their pivots and also the spring-pressed plungers 166 will simply idle over the teeth 165 of the disks 163.

It will be understood that the inward and outward movements of the spools 92 and the control of the main driving clutch is obtained by the heretofore described movements of the main control lever 72. During the manual selection and preselection of the spindle speeds the elements of the mechanism for automatically selecting or preselecting said speeds may idly move in accordance with the last setting of the device for obtaining automatic selection or preselection, but do not have any effect on the manual selection or preselection of the spindle speeds as just referred to.

When it is desired to have the unit attachment automatically select or preselect the different spindle speeds, the disks 163 on the sleeve 156 are adjusted in predetermined relative positions correlated to the different spindle speeds in the different operative steps and also the cam 184 is positioned in a predetermined location with respect to the drum 185 as has been previously explained by means of the knob 197. The operator then screws the clutch actuating pin 158 inwardly to connect the worm wheel 155 to the sleeve 156 and to position the lower pointed end of the pin in the bushing 216 which positions the support 215 and cam 214 with respect to the shoulder actuating pin 212 to render the lock bolt 209 effective. The operator will then start the operation of the motor 149 and the attachment will function to automatically select or preselect the different spindle speeds for the different operative steps, it being understood that the inward and outward movements of the spools 92 to actuating or indexing position as well as the control of the main driving clutch are obtained through the movements of the main control lever 72.

It will also be recalled that when a spindle speed is preselected the indicating drum 127 is held against rotation until the operative step wherein said spindle speed is used is initiated, with the result that the indicating drum 127 will always indicate the spindle speeds and cutting speeds in feet per minute and the current operative step in the work cycle will be indicated.

In the manual selection or preselection of the spindle speeds, the different operative steps will be indicated by the blocks 139, while in the automatic selection or preselection of the spindle speeds the different operative steps in the work cycle will be indicated either by the numerals on the cup-shaped washer 195 or by the blocks 139.

It will be understood that in most instances the machine will be operated with automatic selection or preselection of the spindle speeds and such operation is the preferred one. It will be appreciated that the automatic selection or preselection of the spindle speeds is advantageous and materially adds to the efficiency of operation of the machine.

Although a preferred embodiment of the invention has been illustrated and described herein, it will be understood that the invention is susceptible of various modifications and adaptations within the scope of the appended claims.

Having thus described my invention, I claim:

1. In a machine tool having a part to be moved at different speeds in the operative cycle, movable means operable for selecting or preselecting the different speeds for said part and including a plurality of preadjusted stop members and a plurality of stop fingers corresponding in number to said members and cooperating with the latter for stopping movement of said movable means in different positions correlated to the different speeds of the movable part in the operative cycle.

2. In a machine tool having a part to be moved at different speeds in the operative cycle, movable means operable for selecting or preselecting the different speeds of said part and including an element provided with a plurality of preadjusted stop members, and a plurality of stop fingers corresponding in number to said members and cooperating therewith to stop the movement of said element at various positions correlated with respect to the different speeds of said movable part.

3. In a machine tool having a part to be moved at different speeds in the operative cycle, movable means operable for selecting or preselecting the different speeds of said part and including an element provided with a plurality of preadjusted stop members, a plurality of stop fingers corresponding in number to said members, and an indexible member cooperating with said stop fingers to position one of said stop fingers at a time in cooperative relationship with one of said stop members to stop movement of said element in various positions correlated with respect to the different speeds of said movable part.

4. In a machine tool having a part to be moved at different speeds in the operative cycle, movable means operable for selecting or preselecting the different speeds of said part and including an element provided with a plurality of preadjusted stop members, a plurality of stop fingers corresponding in number to said stop member, an indexible member cooperating with said stop fingers to position one at a time thereof in cooperative relationship with one or another of said stop members, a manually operated means, and an operative connection between said manual means and said indexible member whereby movement of the former actuates said indexible member to position one or another of said stop fingers.

5. In a machine tool having a part to be moved at different speeds in the operative cycle, movable means operable for selecting or preselecting the different speeds of said part and including an element provided with a plurality of preadjusted stop members, stop fingers corresponding in number to said members, an indexible member, manually operated means for indexing said last member in one direction to sequentially position one at a time of said stop fingers in cooperative relationship with a respective stop member to stop the movement of said element in various positions correlated to the different speeds of said movable part, and spring means for moving said indexible member in the opposite direction.

6. In a machine tool having a part to be moved at different speeds in the operative cycle, movable means operable for selecting or preselecting the different speeds of said part and including an element provided with a plurality of preadjusted stop members, a plurality of stop fingers corresponding in number to said members, an indexible member, manually operated means for indexing said last member in one direction to move one or another of said stop fingers into cooperative relationship with one or another of said stop members to stop the movement of said element in various positions correlated with respect to the different speeds of said movable part, and spring means for rotating said indexible member in the opposite direction, said one or the other of said stop fingers acting to restrain said indexible member against movement under the action of said spring.

7. In a machine tool having a part to be moved at different speeds in the operative cycle, movable means operable for selecting or preselecting the different speeds of said part and including an element provided with a plurality of preadjusted stop members corresponding in number to the operative steps in the work cycle, a corresponding number of stop fingers, an indexible member, manually operated means for indexing said last member in one direction and by predetermined increments to operatively position one or another of said fingers in operative relationship with one or another of said stop members to stop the movement of said element in various positions correlated with respect to the different speeds of said movable part in the various steps of the cycle, spring means tending to rotate said indexible member in the opposite direction, said stop finger which is currently acting as a stop also restraining rotation of said indexible member under the action of said spring, and means associated with said element for releasing all of said stop fingers at the end of the operative cycle whereby said indexible member is free to be moved by said spring.

8. In a machine tool having a part to be moved at different speeds in the operative cycle, movable means operable for selecting or preselecting the different speeds of said part and including an element provided with a plurality of preadjusted stop members corresponding in number to the operative steps in the cycle, a corresponding number of stop fingers, an indexible member for operatively and sequentially positioning certain of said fingers to engage certain of said stop members to stop movement of said element in various positions correlated to the different speeds of the movable part, manually operated means for indexing said indexible member in one direction and in predetermined increments and including a pawl cooperating with teeth on said indexible member, and a cam adjustably positioned relative to said indexible member for releasing said pawl at the end of the operative cycle, and spring means for returning said indexible member to its initial position.

9. In a machine tool having a part to be moved at different speeds in the operative cycle, movable means operable for selecting or preselecting the different speeds of said part and including an element provided with a plurality of preadjusted stop members, an indexible member, a plurality of stop fingers, and manually operated means for indexing said indexible member in one direction step by step to operatively position said stop fingers one at a time in cooperative relationship with one or another of said stop members to stop the movement of said element in various positions correlated with respect to the different speeds of said movable part, said means including a pawl cooperating with ratchet teeth formed on said indexible member, a cam for moving said pawl to an inactive position at the end of the cycle, and a second pawl for retaining the first pawl in said inactive position, means operated by said first pawl when in the inactive position to move all of said stop fingers to an inoperative position, and spring means for returning said indexible member to its original position when said stop fingers have been thus moved.

10. In a machine tool having a part to be moved at different speeds in the operative cycle, movable means operable for selecting or preselecting the different speeds of said part and including an element provided with a plurality of preadjusted stop members, an indexible member, a plurality of stop fingers, and manually operated means for indexing said indexible member in one direction step by step to operatively position said stop fingers one at a time in cooperative relationship with one or another of said stop members to stop the movement of said element in various positions correlated with respect to the different speeds of said movable part, said means including a pawl cooperating with ratchet teeth formed on said indexible member, a cam for moving said pawl to an inactive position at the end of the cycle, a second pawl for retaining the first pawl in said inactive position, means operated by said first pawl when in the inactive position to move all of said stop fingers to an inoperative position, spring means for returning said indexible member to its original position when said stop fingers have been thus moved, and releasing means carried by said indexible member and functioning upon the return of said member to its original position to release said first pawl and allow it to be restored to active position.

11. In a machine tool having a part to be moved at different speeds in the operative cycle, movable means operable for selecting or preselecting the different speeds of said part and including an element provided with a plurality of preadjusted stop members corresponding in number to the operative steps in the cycle, a corresponding number of stop fingers, an indexible member for operatively and sequentially positioning certain of said fingers to engage certain of said stop members to stop movement of said element in various positions correlated to the different speeds of the movable part, means for indexing said indexible member in one direction and in predetermined increments and including a pawl, a cam operatively associated with said indexible member for releasing said pawl at the end of the operative cycle, means for adjustably positioning said cam relative to said indexible member and in relation to the number of operative steps in the cycle, and spring means for returning said indexible member to its initial position upon the completion of the cycle.

12. In a machine tool having a part to be moved at different speeds in the operative cycle, movable means operable for selecting or preselecting the different speeds of said part and including an element provided with a plurality of preadjusted stop members corresponding in number to the operative steps in the cycle, a corresponding number of stop fingers, an indexible member for operatively and sequentially positioning certain of said stop fingers to engage certain of said stop members to stop movement of said element in various positions correlated to the different speeds of the movable part, means for indexing said indexible member in one direction and in predetermined increments and including a pawl cooperating with teeth on said indexible member, a cam operatively associated with said indexible member for releasing said pawl at the end of the operative cycle, means for adjustably positioning said cam relative to said indexible member in relation to the number of operative steps in the cycle, means for indicating the desired position of said cam and including indicia carried by said indexible member, a fixed pointer cooperating therewith, and a pointer operatively associated with said cam, and spring means for returning said indexible member to its initial position upon the completion of the cycle.

13. In a machine tool having a part to be moved at different speeds in the operative cycle, movable means operable for selecting or preselecting the different speeds for said part and including a movable element provided with a plurality of stop members relatively adjustable thereto, means for adjusting said stop members relative to said element and including a plunger for each member and movable into position to cause relative movement between said member and said element when the latter moves in one direction, and means operatively connecting each of said members with said element whereby movement therebetween may occur in one direction while said members and said element will be keyed together for simultaneous movement in the opposite direction.

14. In a machine tool having a part to be moved at different speeds in the operative cycle, movable means operable for selecting or preselecting the different speeds for said part and including a movable element provided with a plurality of stop members relatively adjustable thereto, means for adjusting said stop members relative to said element and including a plurality of plungers each movable from a normally inoperative position into an operative position to cause relative movement between a particular member and said element when the latter moves in one direction, means for normally locking said plungers in said inoperative position, and means operatively connecting each of said members with said element whereby relative movement therebetween may occur in one direction while said members and said element will be keyed together for simultaneous movement in the opposite direction.

15. In a machine tool having a part to be moved at different speeds in the operative cycle, movable means operable for selecting or preselecting the different speeds for said part and including a movable element provided with a plurality of stop members relatively adjustable thereto, means for adjusting said stop members relative to said element and including a plurality of plungers each of which cooperates with a particular member and is movable from normally inoperative position into an operative position to cause relative movement between said member and said element when the latter moves in one direction, each of said plungers being provided intermediate its ends with a locking portion, a movable locking pin provided with a plurality of locking portions corresponding in number to said plungers and adapted to cooperate with the locking portions thereof in one position of said pin, key operated means for moving said pin to and from locking position, and means operatively connecting each of said members with said element whereby relative movement therebetween may occur in one direction while said members and said element will be keyed together for simultaneous movement in the opposite direction.

16. In a machine tool having a member to be moved at different speeds in the different steps of an operative cycle, mechanism including a part indexible to select or preselect the different speeds and movable to obtain said speeds, an indicating dial, locking means normally restraining said dial against movement, actuating means for said dial, operative connections between said actuating means and said part such that indexing of said part conditions said actuating means to move said dial a predetermined amount, operative connections between said locking means and said part such that movement of said part to obtain said speeds retracts said locking means.

17. In a machine tool having a member to be moved at different speeds, mechanism including a part indexible to select or preselect said different speeds and movable to obtain the selected or preselected speeds, an indicating dial, locking means restraining said dial against movement, actuating means for said dial including a cam and a roller one of which is operatively connected to said dial and the other of which is operatively connected to said part such that said cam and roller are relatively moved to a predetermined relationship during indexing of said part, and means operatively connecting said locking means with said part such that movement of said part to obtain said speeds withdraws said locking means and allows relative movement between said cam and roller to position said dial to indicate the obtained speed.

18. In a machine tool having a member to be moved at different speeds, mechanism for selecting or preselecting and for obtaining the selected or preselected speeds, an indicating device, and means operatively connecting said device with said mechanism and including cooperating elements such that said device is actuated to the selected or preselected speed only when said mechanism functions to obtain the said speed.

19. In a machine tool having a part to be moved at different speeds, mechanism first functioning to select or preselect the different speeds and then functioning to obtain the selected or preselected speeds, an indicating device, and means operatively associating said indicating device and said mechanism and including cooperating elements such that the functioning of said mechanism to obtain a selected or preselected speed automatically actuates said device to indicate said speed.

20. In a machine tool having a part to be moved at different speeds, mechanism first functioning to select or preselect the different speeds of said part and then functioning to obtain the selected or preselected speeds, an indicating device, and means operatively associating said indicating device with said mechanism and including cooperating elements such that during the functioning of said mechanism to select or preselect said speeds no indicating movement is imparted to said device, while during the functioning of said mechanism to obtain the selected or preselected speeds indicating movement is imparted to said device to indicate the said obtained speed.

21. In a machine tool having a part to be moved at different speeds in the operative cycle, movable means operable for selecting or preselecting the different speeds for said part, means for stopping said movable means in predetermined positions correlated to the different speeds of said part, power means for operating said movable means, and operative connections between said power means and said movable means such that when said movable means is stopped in said predetermined positions said operative connections are automatically rendered inoperative.

22. In a machine tool having a part to be moved at different speeds, mechanism indexible to select or preselect said speeds and movable to obtain the same, an indicating device, operative connections between said indicating device and said mechanism, and means operatively associated with said operative connections and selectively effective to cause movement of said indicating device only during the indexing of said mechanism to select or preselect the different speeds or to hold said device against movement during the indexing movement of said mechanism and to effect movement of said device only during the movement of said mechanism in obtaining the selected or preselected speeds.

23. In a machine tool having a part to be moved at different speeds, mechanism indexible to select or preselect the different speeds for said part and movable to obtain the selected or preselected speeds, an indicating device, operative connections between said indicating device and said mechanism, means including a locking member effective to restrain said device against movement during indexing of said mechanism but ineffective during movement of said mechanism to obtain the selected or preselected speeds, and means for selectively rendering said locking member ineffective at all times whereby said indicating device may move during indexing of said mechanism.

24. In a machine tool having a part to be moved at different speeds, mechanism indexible to select or preselect said speeds and movable to obtain the selected or preselected speeds, a power source, operative connections between said power source and said mechanism and including a clutch, an indicating device, operative connections between said device and said mechanism and including a member for restraining said device against movement during indexing of said mechanism, and means selectively operable to render both said clutch and said locking member inactive.

25. In a machine tool, movable means operable for selecting or preselecting the different speeds of a movable part of the machine and including an indexible element, means for indexing said element in one direction and in predetermined increments and including a pawl cooperating with teeth on said element, a cam operatively associated with said element for releasing said pawl at the end of the operative cycle, means for adjustably positioning said cam relative to said element in relation to the number of operative steps in the cycle, means for indicating the desired position of said cam and including indicia carried by said element, a fixed pointer cooperating with said indicia, a movable member operatively associated with said cam by means of a spline connection and provided with a pointer to cooperate with said indicia and said first named pointer, said element and said member having cooperating portions constituting a clutch, a spring normally urging said clutch portions into engaged relationship whereby said member can be moved against the action of said spring and adjusted to bring the pointer carried thereby into cooperative relationship with the indicia carried by said element, and a second spring for returning said indexible element to its initial position upon the completion of the cycle.

26. In combination in a machine tool having a part to be moved at different rates in the different steps of an operative cycle, an indexible member for selecting or preselecting the different rates of said part, an indicating device for indicating the different rates of said part, operative connections between said member and said device, power means, operative connections between said power means and said member including a clutch, means for stopping movement of said indexible member in predetermined positions correlated to different rates of movement of said part, and means associated with said second named operative connections for automatically disengaging the said clutch when said member is thus stopped.

27. In combination in a machine tool having a part to be moved at different rates in the different operative steps of a work cycle, an indexible member for selecting or preselecting the different rates of movement for said part, a device for indicating the rates of movement for said part, operative connections between said member and said device, means to hold said member in certain predetermined indexed positions, means for releasing said last named means, power means and operative connections between said power means and said member including a clutch, and mechanism such that when said holding means is released said clutch is automatically engaged.

28. In combination in a machine tool having a part to be moved at different rates in the different operative steps of a work cycle, an indexible member for selecting or preselecting the different rates of movement for said part, a device for indicating the different rates of movement of said part, operative connections between said device and said member, power means for driving said member, means for stopping said member in certain predetermined indexed positions correlated to rates of movement of said part, and operative connections between said power means and said member and including a clutch and mechanism such that when said stop means is inactive said clutch is automatically engaged to effect indexing of said member and when said stop means is active said clutch is automatically disengaged to interrupt the drive to the indexible member.

29. In combination in a machine tool having a part to be moved at different rates in the different operative steps of a work cycle, an indexible member for selecting or preselecting the rates of movement of said part, a device for indicating the rates of movement of said part, operative connections between said member and said device, power means for driving said member, means for stopping said member in certain predetermined indexed positions correlated to the rates of movement of said part, and operative connections between said power means and said member and including a clutch, a spring urging said clutch into engagement, a worm, and a worm wheel intermediate said clutch and said member and acting when indexing movement of said member is stopped by said stop means to cause an endwise movement of said worm to move said clutch to disengaged position.

NICHOLAS P. DARASH.